United States Patent
Maymandi Nejad et al.

(10) Patent No.: US 11,855,815 B1
(45) Date of Patent: Dec. 26, 2023

(54) REAL TIME PHASE ERROR DETECTION IN QUADRATURE DEMODULATORS

(71) Applicant: Panasonic Intellectual Property Management Co., Ltd., Osaka (JP)

(72) Inventors: Mohammad Maymandi Nejad, Hopkinton, MA (US); Ronald J. Lipka, Northborough, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/821,855

(22) Filed: Aug. 24, 2022

(51) Int. Cl.
  *H04L 25/06* (2006.01)
  *H04W 56/00* (2009.01)

(52) U.S. Cl.
  CPC ....... *H04L 25/061* (2013.01); *H04W 56/0035* (2013.01)

(58) Field of Classification Search
  CPC .......................... H04L 25/061; H04W 56/0035
  See application file for complete search history.

(56) References Cited

U.S. PATENT DOCUMENTS

| | | | | |
|---|---|---|---|---|
| 6,959,179 | B1* | 10/2005 | Wong | H04B 1/30 455/334 |
| 8,289,087 | B2 | 10/2012 | Katayama et al. | |
| 10,900,805 | B2 | 1/2021 | Quartiroli et al. | |
| 2010/0080333 | A1* | 4/2010 | Stengel | H03D 7/166 375/371 |
| 2011/0065412 | A1* | 3/2011 | Beffa | H03D 7/165 455/326 |
| 2011/0076976 | A1* | 3/2011 | Ben-Ayun | H04B 1/109 455/226.2 |
| 2014/0341594 | A1* | 11/2014 | Olsson | H04B 10/616 398/203 |
| 2014/0355655 | A1* | 12/2014 | Chakraborty | H04B 1/40 375/219 |
| 2018/0183456 | A1* | 6/2018 | Lee | H03M 1/442 |

OTHER PUBLICATIONS

T. Ohshima et al, "Correction of Phase and Amplitude Error of RF Modulator and Demodulator", Hardware Technology, Proceedings of ICALEPCS2009, Kobe, Japan, pp. 453-455.

* cited by examiner

*Primary Examiner* — Janice N Tieu
(74) *Attorney, Agent, or Firm* — PEARNE & GORDON LLP

(57) ABSTRACT

An apparatus for detecting a Q-demodulator's real-time phase and offset error includes an RF signal path configured to receive an RF signal from an RF component, a first chopper to chop the RF signal at a first frequency to generate a chopped RF signal, an LO signal path configured to receive an LO signal, a second chopper to chop the LO signal at a second frequency to generate a chopped LO signal, a summing mechanism to combine the chopped LO signal to the chopped RF signal into a combination signal. The apparatus further includes a Q-demodulator comprising a phase shifter configured to shift a phase of the combination signal and a phase of the LO signal, and a mixer configured to multiply the shifted combination signal by the shifted LO signal to generate a baseband signal, and at least two filters configured to extract different signals contained in the baseband signal for analysis.

20 Claims, 5 Drawing Sheets

REAL TIME PHASE ERROR DETECTION IN QUADRATURE DEMODULATORS

TECHNICAL FIELD

The present disclosure relates to apparatus and methods for detecting real-time phase and offset errors in a quadrature demodulator (Q-demodulator). In particular, the present disclosure discloses electric circuits including two choppers for RF signals and LO signals before a Q-demodulator to generate a baseband signal, and several filters to extract different signals from the baseband signal for analysis and compensation.

BACKGROUND

Modulators and demodulators are used to transfer the data through different frequency bands in various RF communication circuits. In the circuits where a quadrature modulator and/or demodulator are used, it needs to have both in-phase and quadrature versions of RF signals. For extracting the quadrature components of the signals, the radio frequency (RF) and local oscillator (LO) input signals of the demodulator are shifted by 90 degrees with respect to each other.

If there are any errors in the 90-degree phase shift, the output of the demodulator will also contain errors. Hence, there is a need for the technique for detecting a phase shift error in quadrature demodulators.

SUMMARY

In one aspect, an apparatus for detecting a phase error includes an RF signal path configured to receive an RF signal from an RF component, a first chopper comprising a chopping switch to chop the RF signal at a first frequency to generate a chopped RF signal, an LO signal path configured to receive an LO signal, a second chopper comprising a chopping switch to chop the LO signal at a second frequency to generate a chopped LO signal, a summing mechanism (e.g., an adder) disposed on the RF path, and configured to combine the chopped LO signal to the chopped RF signal into a combination signal. The apparatus further includes a quadrature demodulator (Q-demodulator) comprising a phase shifter configured to shift a phase of the combination signal to generate a shifted combination signal and configured to shift a phase of the LO signal to generate a shifted LO signal such that a phase difference between the combination signal and the LO signal is set to be 90 degrees, a mixer configured to multiply the shifted combination signal by the shifted LO signal to generate a baseband signal, and at least one filter configured to extract a signal contained in the baseband signal.

In one embodiment, the phase shifter includes a high pass filter configured to shift the phase of the combination signal, and a low pass filter configured to shift the phase of the LO signal.

Particularly, the phase shifter comprises a first amplifier configured to amplify the combination signal and provide the amplified combination signal to the high pass filter, and a second amplifier configured to amplify the LO signal and provide the amplified LO signal to the low pass filter. The first and second amplifiers may function as buffers. The first and second amplifiers are not necessarily needed and may be omitted in some embodiments.

In another embodiment, the apparatus further includes an amplifier configured to amplify the baseband signal outputted from the Q demodulator with a certain gain. The amplifier is not necessarily needed and may be omitted in some embodiments.

In the embodiment, the apparatus further includes an analog-to-digital convertor (ADC) configured to digitize the baseband signal.

Also, the apparatus may further include a digital signal processor (DSP) configured to extract different signals to be analyzed.

Further, the DSP comprises a low pass filter (LPF) configured to output a circuit offset indicating a DC offset generated in the Q-demodulator.

Furthermore, the apparatus includes an offset cancellation loop configured to feed back the circuit offset to the Q-demodulator in order to adjust an offset of Q-demodulator so as to remove an offset error.

In addition, the DSP includes a band pass filter configured to pass a baseband signal of the first chopping frequency to output a desired signal that indicates a result of the operations of the RF component.

In yet another embodiment, the RF component is a gyroscope sensor, and the desired signal indicates an angular velocity measured by the gyroscope sensor.

Additionally, the DSP comprises a band pass filter configured to pass an RF signal of the second chopping frequency to extract an error signal indicating an amount of a phase error generated in the Q-demodulator.

Moreover, the apparatus includes a phase error cancellation loop configured to feed back the error signal to the Q-demodulator to adjust a phase of the Q-demodulator so as to remove a phase error.

The apparatus may further include an attenuator configured to decrease an amplitude of the chopped LO signal. As a result, the decreased amplitude of the chopped LO signal may be greater than, or less than, or equal to an amplitude of the RF signal in the RF path.

In yet another embodiment, the apparatus includes a low pass filter (LPF) configured to output a circuit offset indicating a DC offset generated in the Q-demodulator, and an offset cancellation loop configured to feed back the circuit offset to the Q-demodulator in order to adjust an offset of Q-demodulator so as to remove an offset error.

Also, the apparatus may include a band pass filter configured to pass an RF signal of the first chopping frequency to output a desired signal that indicates a result of the operations of the RF component.

The apparatus also may include a band pass filter configured to pass an RF signal of the second chopping frequency to extract an error signal indicating an amount of a phase error generated in the Q-demodulator, and a phase error cancellation loop configured to feed back the error signal to the Q-demodulator to adjust a phase of Q-demodulator so as to remove a phase error.

In another aspect, a method for detecting a phase error includes receiving an RF signal into an RF signal path from an RF component, chopping the RF signal at a first frequency to generate a chopped RF signal, receiving an LO signal into a LO signal path from a local oscillator, chopping the LO signal at a second frequency to generate a chopped LO signal, combining the chopped LO signal to the chopped RF signal into a combination signal, shifting, by a phase shifter in the quadrature demodulator, a phase of the combination signal to generate a shifted combination signal and a phase of the LO signal to generate a shifted LO signal such that a phase difference between the combination signal and the LO signal is set to be 90 degrees, multiplying, by the quadrature demodulator (Q-demodulator), the shifted combination signal by the shifted LO signal to generate a baseband signal, and extracting a signal contained in the baseband signal by at least one filter.

In one embodiment, the method further includes filtering the baseband signal by a low pass filter to extract a circuit offset indicating a DC offset generated in the Q-demodulator, and feeding back the circuit offset to the Q-demodulator in order to adjust an offset of Q-demodulator so as to remove an offset error.

In another embodiment, the method further includes filtering the baseband signal by a bandpass filter with a center frequency equal to the first chopping frequency to output a desired signal that indicates a result of the operations of the RF component.

In yet another embodiment, the method further includes filtering the baseband signal by a bandpass filter with a center frequency equal to the second chopping frequency to extract an error signal indicating an amount of a phase error generated in the Q-demodulator, and feeding back the error signal to the Q-demodulator to adjust a phase of Q-demodulator so as to remove a phase error.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or a combination thereof, but do not preclude the presence or addition of one or more other features, numbers, steps, operations, components, elements, or combinations thereof.

Figure 1:
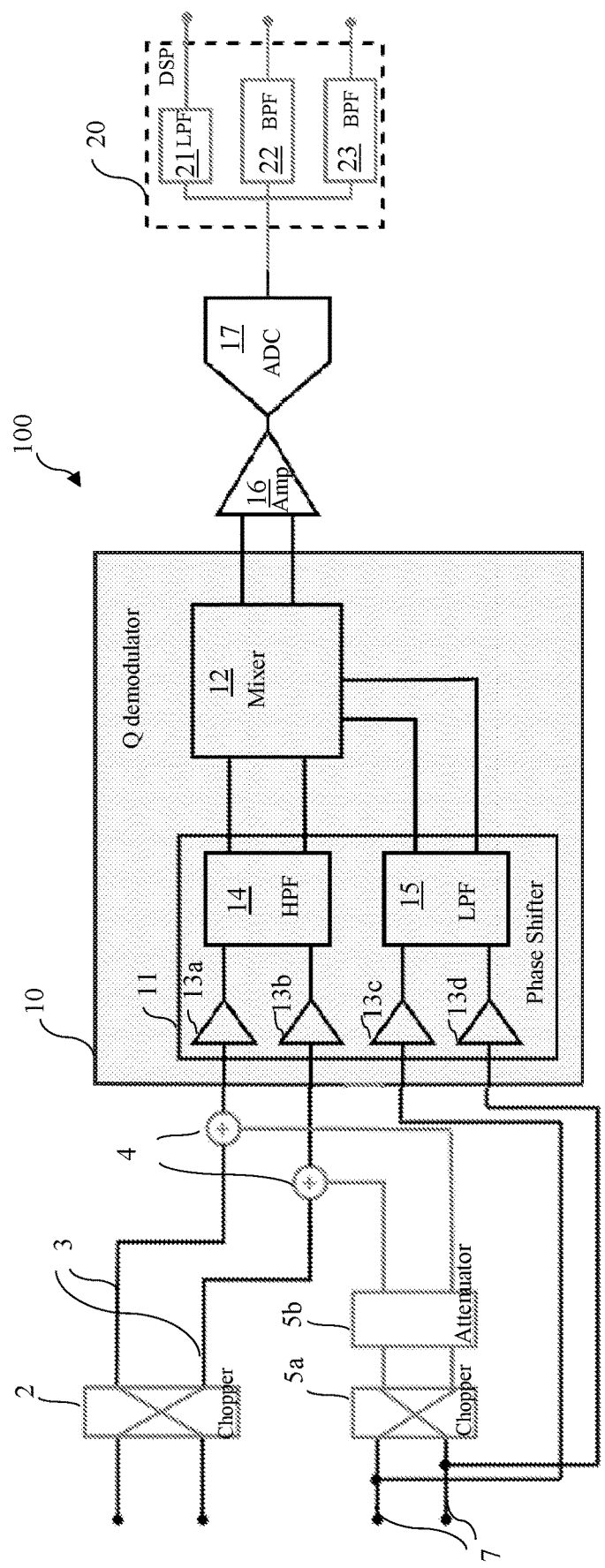
FIG. 1 illustrates an example of an electric circuit for detecting a phase error in a Q-demodulator according to one embodiment of the present disclosure.

FIG. 1 illustrates an example of electric circuit 100 for detecting phase and offset errors in a Q-demodulator according to one embodiment of the present disclosure.

Electric circuit 100 comprises RF path 3 to receive RF signals, first chopper 2 disposed on RF path 3, second chopper 5a and attenuator 5b coupled to LO signal path 7, Q demodulator 10 including phase shifter 11 and mixer 12, amplifier 16, ADC 17, and DSP 20.

Initially, RF path 3 receives RF signals from various RF devices, such as a gyroscope sensor (not shown). The received RF signals are then coupled to first chopper 2 which comprises a set of chopping switches to generate a chopped version of RF signals at a first chopping frequency f_chp1.

Local oscillator signals (LO signals) with an LO frequency are generated from an oscillator (not shown), and are coupled to chopper 5a which comprises a set of chopping switches to generate a chopped version of LO signals at a second chopping frequency f_chp2. Attenuator 5b also includes a set of resistors to decrease the amplitude of the chopped LO signals to a proper value so as to be summed up with the chopped RF signals and then be processed by Q-demodulator 10.

The combined chopped signals and the LO signals are phase-shifted and are mixed within Q demodulator 10 to generate baseband signals.

The attenuated and chopped LO signal is combined with the chopped RF signal by an adder 4, and then the combination signal is fed to high pass filter 14 of phase shifter 11 via amplifiers (or buffers) 13a, 13b. Also, another LO signal is directly provided to low pass filter 15 of phase shifter 11 via amplifiers (or buffers) 13c, 13d.

High pass filter 14 and low pass filter 15 of phase shifter 11 may be implemented with any number of known designs using resistors, inductors, and/or capacitors. Phase shifter 11 shifts the phases of the combination signal and the LO signals such that the phase difference between the combination signal and the LO signals is set to be 90 degrees.

The phase-shifted combination signal and phase-shifted LO signals are then supplied to mixer 12 which multiplies the phase-shifted combined signal by the phase-shifted LO signal to generate baseband signals.

The baseband signals outputted from Q demodulator 10 is provided to amplifier 16, which then amplifies the baseband signals to provide a sufficient gain for facilitating the phase error detection.

The amplified baseband signals are supplied to analog-to-digital converter (ADC) 17 which samples the amplified baseband signals for digitization. ADC 17 may be implemented with known analog to digital converter circuits which generate a digitized version of the baseband signal sampled at a certain sampling frequency.

Following digitization by ADC 17, the digitized baseband signals are supplied to digital signal processor (DSP) 20 to extract different signals to be analyzed. In this embodiment, DSP 20 can comprise three filters: low pass filter (LPF) 21, bandpass filter (BPF) 22 and BPF 23, which are connected in parallel with one another.

LPF 21 is configured to pass a direct current (DC) signal from the digitized baseband signal to extract an offset signal indicating a DC offset generated in the Q-demodulator 10.

BPF 22 is configured to pass a baseband signal of the first chopping frequency f_chp1 to output a desired signal that indicates a result of the operations of the various RF devices. As an example, the desired signal can be a signal indicating an angular velocity measured by a gyroscope sensor in a case where the electric circuit initially receives the RF signals from the gyroscope sensor. Additionally, BPF 22 also can further comprise a root-mean-square (RMS) circuit to obtain an RMS value of the baseband signals of f_chp1.

BPF 23 is configured to pass a baseband signal of the second chopping frequency f_chp2 to extract an error signal indicating the amount of the phase error generated in the Q-demodulator 10. When there is no phase error generated in the Q-demodulator 10, the phase-shifted chopped LO signals will be canceled with another phase-shifted LO signal during the multiplying operation at mixer 12, thus, BPF 23 generates no error signal of the second chopping frequency f_chp2. Additionally, BPF 23 also can further comprise an RMS circuit to obtain an RMS value of the baseband signals of f_chp2.

Figure 2:
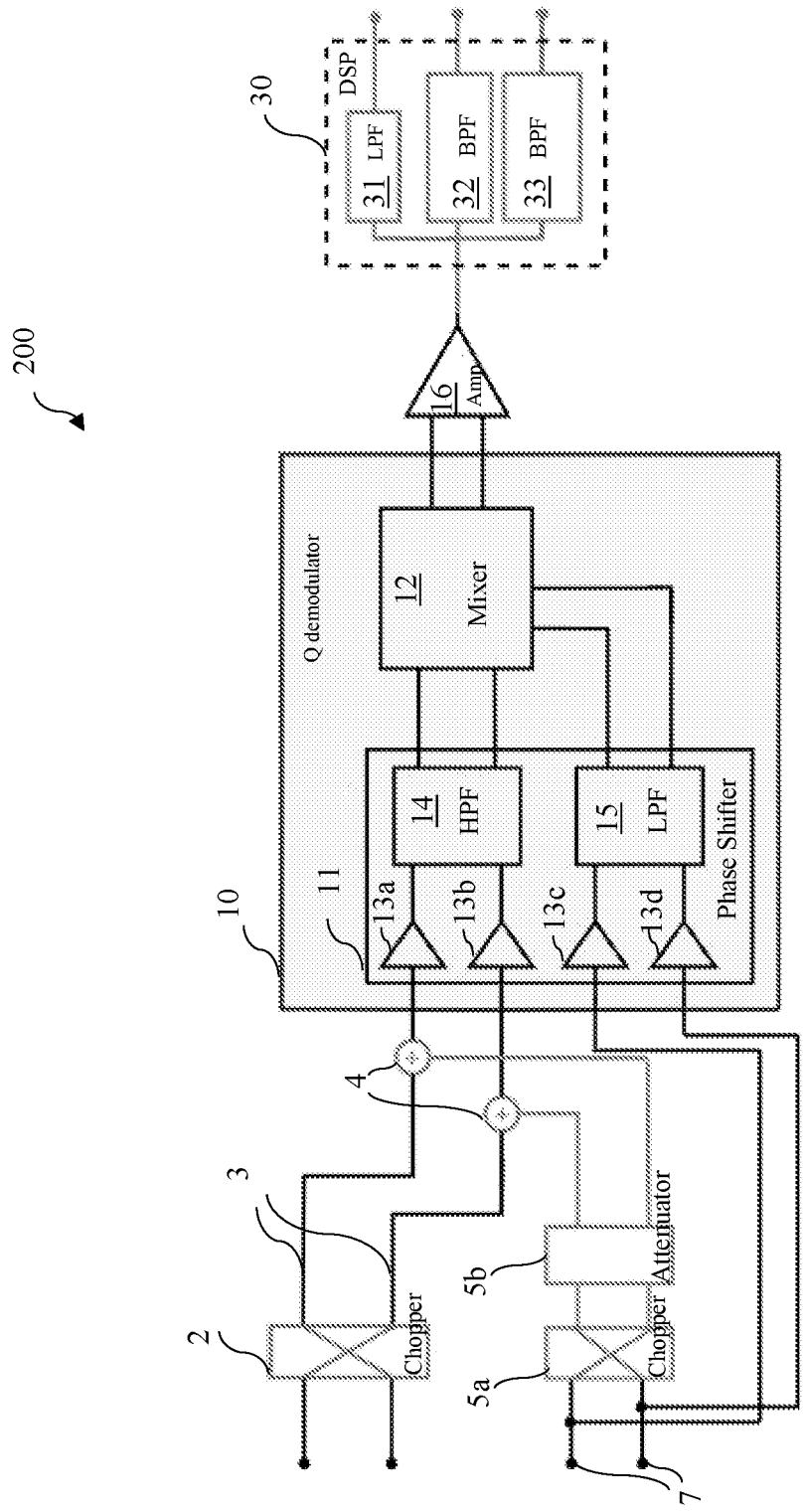
FIG. 2 illustrates another example of an electric circuit for detecting a phase error in a Q-demodulator, according to one embodiment of the present disclosure.

FIG. 2 illustrates another example of electric circuit 200 for detecting phase and offset errors in a Q-demodulator according to one embodiment of the present disclosure.

The electric circuit 200 is similar to the electric circuit 100 illustrated in FIG. 1 other than that analog processing is used to extract different analog signals. Thus, repetitive descriptions of the same components will be omitted.

The circuit 200 comprises first chopper 2 disposed in RF path 3, chopper 5a and attenuator 5b coupled to LO signal path 7, Q-demodulator 10 including phase shifter 11 and mixer 12, amplifier 16, and analog filters 30.

RF signals are chopped at first chopper 2 at a first chopping frequency f_chp1. LO signals are also chopped at second chopper 5a at a second chopping frequency f_chp2 and are attenuated at attenuator 5b, which may comprise resistors to decrease the amplitude of the chopped LO signals to a proper value so as to be summed up with the chopped RF signals and then be processed by Q-demodulator 10. The combined chopped signals and the LO signals are phase-shifted and then are mixed in Q demodulator 10 to generate baseband signals.

The baseband signals are amplified in amplifier 16 with a sufficient gain. In this embodiment, the amplified baseband signals do not go through digitization and are supplied to three parallel analog filters, LPF 31, BPF 32 and BPF 33. These three analog filters extract different analog signals to be analyzed, in contrast to the filters of DSP 20 extracting digitized signals from the digitized baseband signals outputted from ADC 17.

LPF 31 is configured to extract an offset signal indicating the offset generated in the Q-demodulator 10. BPF 32 is configured to pass a signal of the first chopping frequency f_chp1 to output a desired signal. BPF 33 is configured to pass a signal of the second chopping frequency f_chp2 to extract an error signal indicating the amount of the phase error generated in the Q-demodulator 10.

Figure 3:
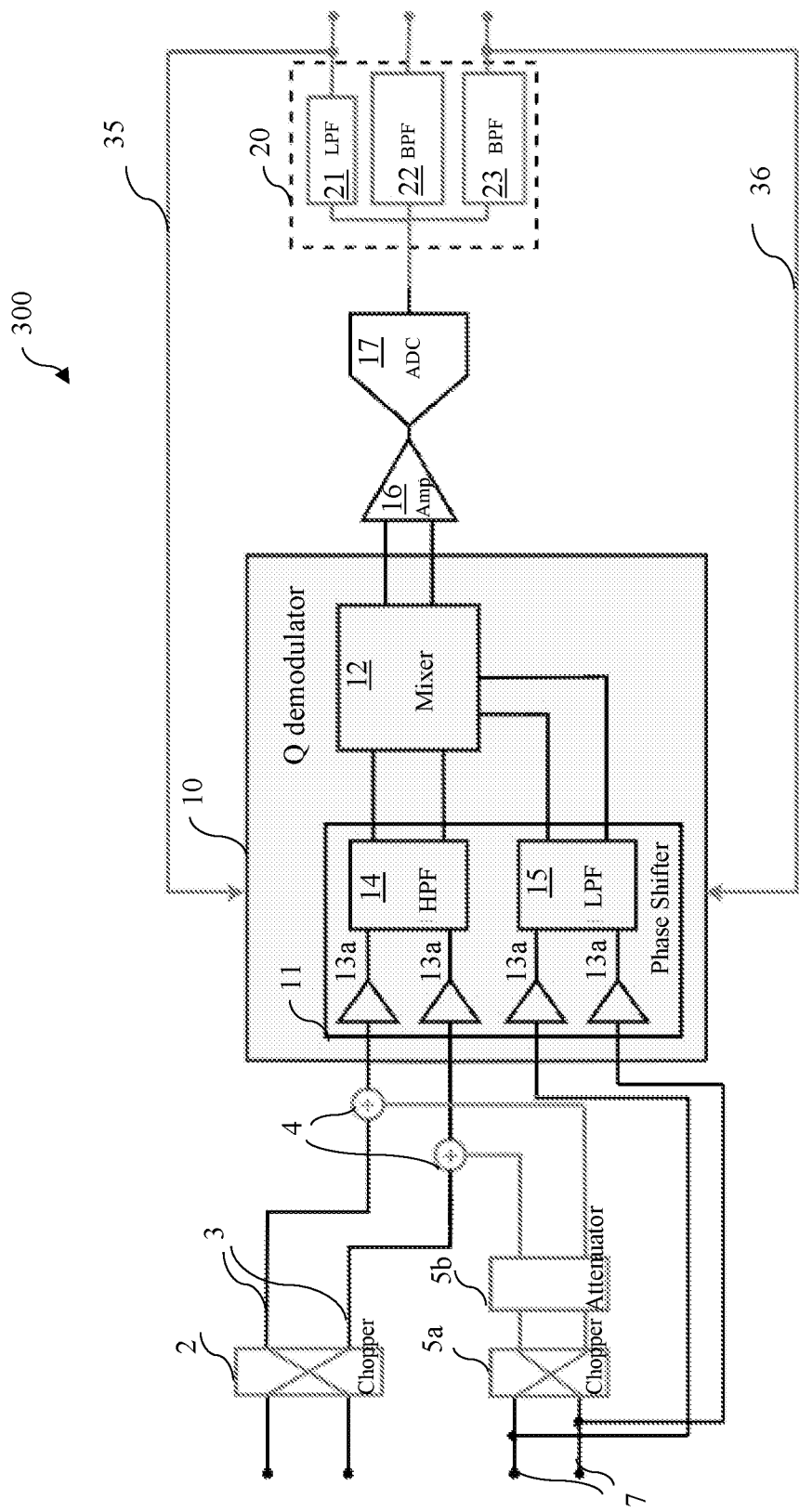
FIG. 3 illustrates the electric circuit illustrated in FIG. 1 with an offset cancellation loop and a phase error cancellation loop, according to one embodiment of the present disclosure.

FIG. 3 illustrates the electric circuit illustrated in FIG. 1 along with an offset cancellation loop and a phase error cancellation loop, according to one embodiment of the present disclosure.

The electric circuit 300 is similar to the electric circuit 100 illustrated in FIG. 1 other than that offset cancellation loop 35 and phase error cancellation loop 36 are added. Thus, repetitive descriptions of the same components will be omitted.

The electric circuit 300 comprises first chopper 2 coupled to RF signal input 1, chopper 5a and attenuator 5b coupled to LO signal path 7, Q-demodulator 10 including phase shifter 11 and mixer 12, amplifier 16, ADC 17, and DSP 20. Similar to the embodiments illustrated in FIG. 1, DSP 20 includes LPF 21 configured to output an offset signal, BPF 22 configured to output a desired signal, and BPF 23 configured to output an error signal.

The electric circuit 300 comprises offset cancellation loop 35 that feeds back the offset signal from the output of LPF 21 to Q-demodulator 10 to adjust the offset of Q-demodulator 10 so as to remove the offset errors.

The electric circuit 300 further comprises phase error cancellation loop 36 that feeds back the error signal from the output of BPF 23 to Q-demodulator 10 to adjust the phase of Q-demodulator 10 so as to remove the phase errors.

Figure 4:
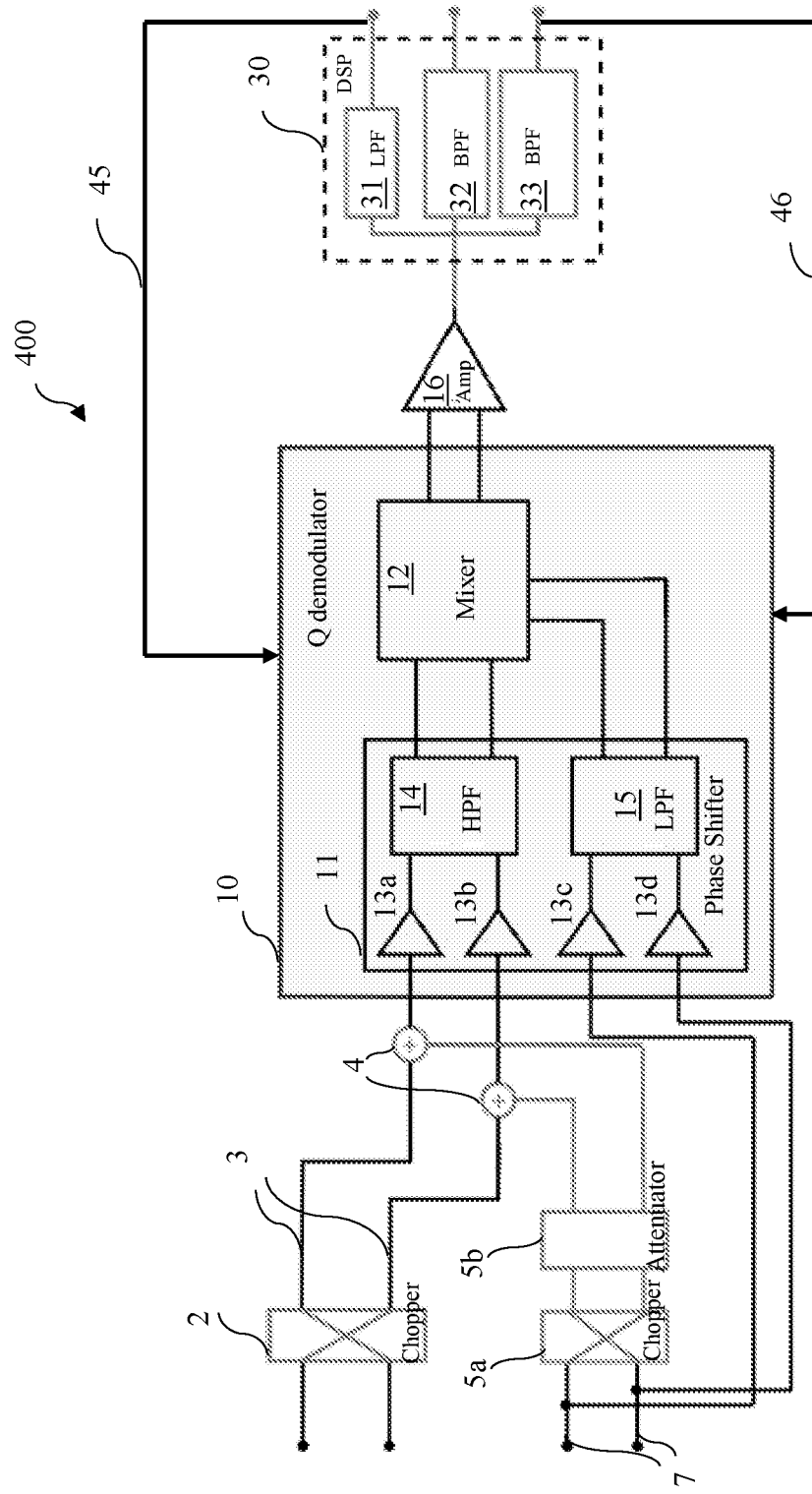
FIG. 4 illustrates the electric circuit illustrated in FIG. 2 with an offset cancellation loop and a phase error cancellation loop, according to one embodiment of the present disclosure.

FIG. 4 illustrates the electric circuit illustrated in FIG. 2 along with an offset cancellation loop and a phase error cancellation loop, according to one embodiment of the present disclosure. The electric circuit 400 is similar to the electric circuit 200 illustrated in FIG. 2 other than that offset cancellation loop 45 and phase error cancellation loop 46 are added. Thus, repetitive descriptions of the same components will be omitted.

The electric circuit 400 comprises offset cancellation loop 45 that feeds back the offset signal from the output of LPF 31 to Q-demodulator 10 to adjust the offset of Q-demodulator 10 so as to remove the offset errors.

The electric circuit 400 further comprises phase error cancellation loop 46 that feeds back the error signal from the output of BPF 33 to Q-demodulator 10 to adjust the phase of Q-demodulator 10 so as to remove the phase errors.

Figure 5:
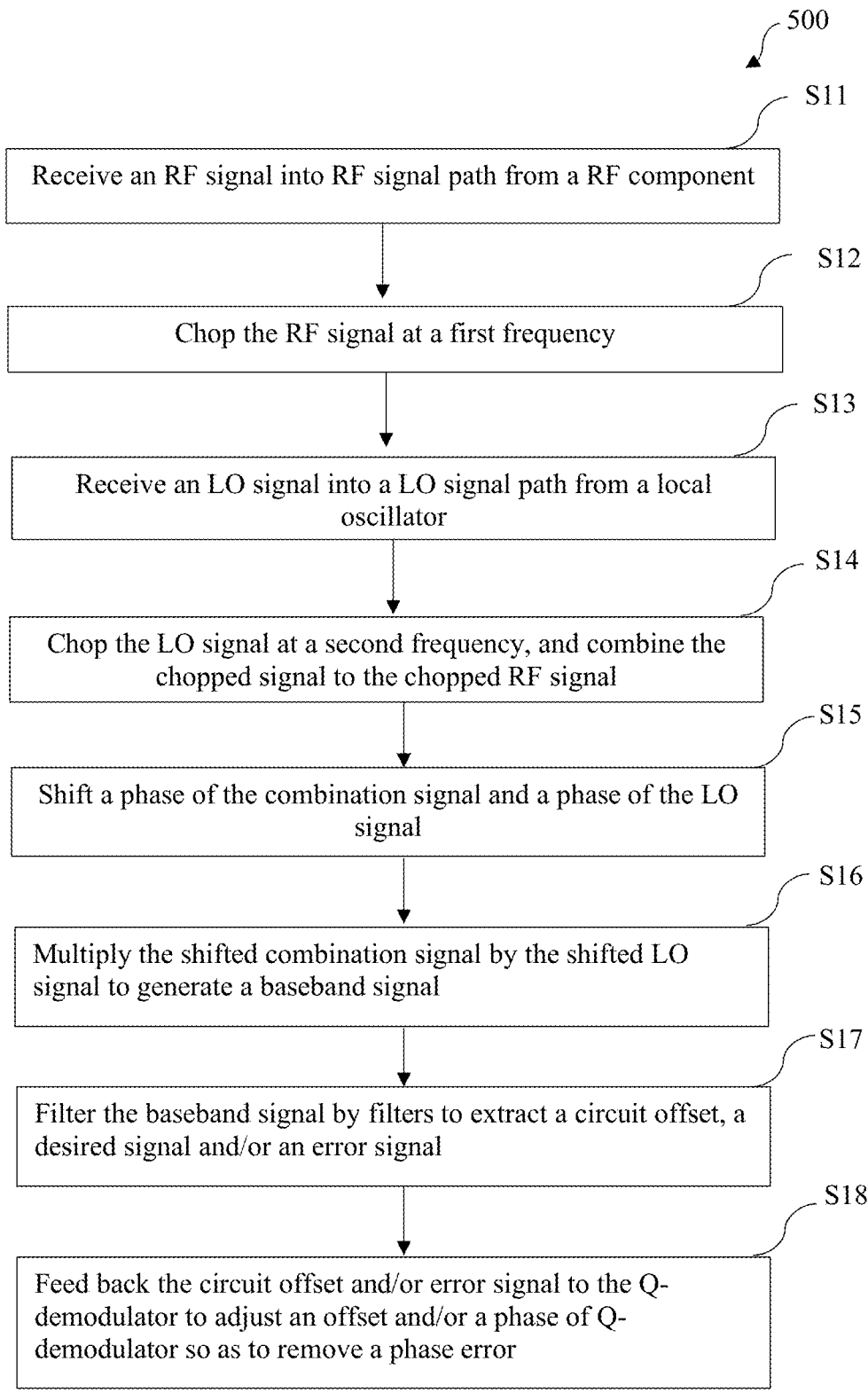
FIG. 5 illustrates an example of a method for detecting a phase error according to one embodiment of the present disclosure.

FIG. 5 illustrates an example of method 500 for detecting a phase error according to one embodiment of the present disclosure.

The method begins with receiving an RF signal into an RF signal path from one of various RF components in step S11.

Subsequently, the received RF signal is chopped by chopper 2 at a first chopping frequency f_chp1 to generate a chopped version of RF signals in step 12.

LO signal is received from an oscillator in step S13, and is chopped by chopper 5a at a second chopping frequency f_chp2 to generate a chopped version of LO signal in step S14. In one embodiment, the LO signal can be further attenuated by an attenuator before or after being chopped.

In step S15, phase shifter 11 shifts the phases of the combination signal and the LO signal such that the phase difference between the combination signal and the LO signals is set to be 90 degrees.

In step S16, mixer 12 multiplies the phase-shifted combination signal by the phase-shifted LO signal to generate a baseband signal.

In step S17, an LPF extracts an offset signal from the baseband signal, a BPF with a center frequency equal to the first chopping frequency extracts a desired signal from the baseband signal, and a BPF with a center frequency equal to the second chopping frequency extracts an error signal from the baseband signal. The first chopping frequency is distanced away from the second chopping frequency such that the desired signal does not interfere with the error signal. As an example, the first chopping frequency can be a 20K Hz, and the second chopping frequency can be a 50K Hz.

In step S18, an offset cancellation loop feeds back the offset signal from the output of an LPF to a Q-demodulator 10 to adjust the offset of Q-demodulator 10 so as to remove the offset errors. Also, a phase error cancellation loop feeds back the error signal from the output of an LPF to Q-demodulator 10 to adjust the phase of Q-demodulator 10 so as to remove the phase errors.

Although the present disclosure has been described with an exemplary embodiment, various changes and modifications may be suggested to one skilled in the art. It is intended that the present disclosure encompasses such changes and modifications as fall within the scope of the appended claims.

What is claimed is:

1. An apparatus for detecting phase and offset errors, the apparatus comprising:
   an RF signal path configured to receive an RF signal from an RF component;
   a first chopper comprising a chopping switch to chop the RF signal at a first frequency to generate a chopped RF signal;
   an LO signal path configured to receive an LO signal;
   a second chopper comprising a chopping switch to chop the LO signal at a second frequency to generate a chopped LO signal;
   a summing mechanism disposed on the RF path, and configured to combine the chopped LO signal and the chopped RF signal to generate a combination signal;
   a Q-demodulator comprising:
      a phase shifter configured to shift a phase of the combination signal to generate a shifted combination signal and configured to shift a phase of the LO signal to generate a shifted LO signal such that a phase difference between the combination signal and the LO signal is set to be 90 degrees;
      a mixer configured to multiply the shifted combination signal by the shifted LO signal to generate a baseband signal; and
   at least one filter configured to extract a signal contained in the baseband signal.

2. The apparatus according to claim 1, wherein the phase shifter comprises:
   a high pass filter configured to shift the phase of the combination signal; and
   a low pass filter configured to shift the phase of the LO signal.

3. The apparatus according to claim 1, wherein the phase shifter comprises:
   a first amplifier or a first buffer configured to amplify the combination signal and provide the amplified combination signal to the high pass filter; and
   a second amplifier or a second buffer configured to amplify the LO signal and provide the amplified LO signal to the low pass filter.

4. The apparatus according to claim 1, further comprising:
   an amplifier configured to amplify the baseband signal outputted from the Q demodulator with a certain gain.

5. The apparatus according to claim 1, further comprising an analog-to-digital converter (ADC) configured to digitize the baseband signal.

6. The apparatus according to claim 5, further comprising a digital signal processor (DSP) configured to extract different signals to be analyzed.

7. The apparatus according to claim 6, wherein the DSP comprises:
   a low pass filter (LPF) configured to output a circuit offset indicating a DC offset generated in the Q-demodulator.

8. The apparatus according to claim 7, further comprising:
   an offset cancellation loop configured to feed back the circuit offset to the Q-demodulator in order to adjust an offset of Q-demodulator so as to remove an offset error.

9. The apparatus according to claim 5, wherein the DSP comprises:
   a band pass filter configured to pass a baseband signal of the first chopping frequency to output a desired signal that indicates a result of the operations of the RF component.

10. The apparatus according to claim 9, wherein the RF component is a gyroscope sensor, and the desired signal indicates an angular velocity measured by the gyroscope sensor.

11. The apparatus according to claim 5, wherein the DSP comprises:
    a bandpass filter configured to pass a baseband signal of the second chopping frequency to extract an error signal indicating an amount of a phase error generated in the Q-demodulator.

12. The apparatus according to claim 1, further comprising:
    a phase error cancellation loop configured to feed back the error signal to the Q-demodulator to adjust a phase of the Q-demodulator so as to remove a phase error.

13. The apparatus according to claim 1, further comprising:
an attenuator configured to decrease an amplitude of the chopped LO signal to be summed with the RF signal in the RF path.

14. The apparatus according to claim 1, further comprising:
a low pass filter (LPF) configured to output a circuit offset indicating a DC offset generated in the Q-demodulator, and
an offset cancellation loop configured to feed back the circuit offset to the Q-demodulator in order to adjust an offset of Q-demodulator so as to remove an offset error.

15. The apparatus according to claim 1, further comprising:
a band pass filter configured to pass a baseband signal of the first chopping frequency to output a desired signal that indicates a result of the operations of the RF component.

16. The apparatus according to claim 1, further comprising:
a bandpass filter configured to pass a baseband signal of the second chopping frequency to extract an error signal indicating an amount of a phase error generated in the Q-demodulator, and
a phase error cancellation loop configured to feed back the error signal to the Q-demodulator to adjust a phase of the Q-demodulator so as to remove a phase error.

17. A method for detecting phase and offset errors, the method comprising:
receiving an RF signal into an RF signal path from an RF component;
chopping the RF signal at a first frequency to generate a chopped RF signal;
receiving an LO signal into a LO signal path from a local oscillator;
chopping the LO signal at a second frequency to generate a chopped LO signal;
combining the chopped LO signal to the chopped RF signal into a combination signal;
shifting, by a quadrature demodulator, a phase of the combination signal to generate a shifted combination signal and a phase of the LO signal to generate a shifted LO signal such that a phase difference between the combination signal and the LO signal is set to be 90 degrees;
multiplying, by the quadrature demodulator, the shifted combination signal by the shifted LO signal to generate a baseband signal; and
extracting a signal contained in the baseband signal by at least one filter.

18. The method according to claim 17, further comprising:
filtering the baseband signal by a low pass filter to extract a circuit offset indicating a DC offset generated in the Q-demodulator; and
feeding back the circuit offset to the Q-demodulator in order to adjust an offset of Q-demodulator so as to remove an offset error.

19. The method according to claim 17, further comprising:
filtering the baseband signal by a bandpass filter with a center frequency equal to the first chopping frequency to output a desired signal that indicates a result of the operations of the RF component.

20. The method according to claim 17, further comprising:
filtering the baseband signal by a bandpass filter with a center frequency equal to the second chopping frequency to extract an error signal indicating an amount of a phase error generated in the Q-demodulator; and
feeding back the error signal to the Q-demodulator to adjust a phase of the Q-demodulator so as to remove a phase error.

* * * * *